United States Patent
Czarnota

(10) Patent No.: US 12,469,309 B2
(45) Date of Patent: Nov. 11, 2025

(54) METHOD OF CONSTRUCTING TOY MODELS BASED ON AN IMAGE

(71) Applicant: EMAGINEER PTY LTD, Beaumaris (AU)

(72) Inventor: Keira Czarnota, Beaumaris (AU)

(73) Assignee: EMAGINEER PTY LTD, Beaumaris (AU)

( * ) Notice: Subject to any disclaimer, the term of this patent is extended or adjusted under 35 U.S.C. 154(b) by 910 days.

(21) Appl. No.: 16/608,591

(22) PCT Filed: Apr. 26, 2018

(86) PCT No.: PCT/AU2018/000061
§ 371 (c)(1),
(2) Date: Oct. 25, 2019

(87) PCT Pub. No.: WO2018/195583
PCT Pub. Date: Nov. 1, 2018

(65) Prior Publication Data
US 2020/0184195 A1    Jun. 11, 2020

(30) Foreign Application Priority Data

Apr. 26, 2017 (AU) ................................ 2017901510
Mar. 2, 2018 (AU) ................................ 2018900678

(51) Int. Cl.
*G06V 20/64* (2022.01)
*A63H 33/04* (2006.01)
(Continued)

(52) U.S. Cl.
CPC ........... *G06V 20/647* (2022.01); *A63H 33/04* (2013.01); *G06F 9/455* (2013.01); *G06F 16/9035* (2019.01); *G06Q 10/0875* (2013.01)

(58) Field of Classification Search
CPC ...... G06V 20/647; A63H 33/04; A63H 33/042; A63H 2200/00; G06F 9/455;
(Continued)

(56) References Cited

U.S. PATENT DOCUMENTS 6,004,021 A * 12/1999 Rothbarth ............. A63F 7/3622
                                                        703/2
7,092,899 B2 * 8/2006 Simas .................... G06T 19/20
                                                        705/26.1
(Continued)

FOREIGN PATENT DOCUMENTS

GB        2532075 A       5/2016
JP        2001283055 A *  10/2001
WO        2016/075081 A1  5/2016

OTHER PUBLICATIONS

Schulz et al. "Design and fabrication by example". ACM Transactions on Graphics vol. 33Issue 4 Jul. 2014 Article No. 62 pp. 1-11. (Year: 2014).*
(Continued)

*Primary Examiner* — Eunhee Kim
(74) *Attorney, Agent, or Firm* — TraskBritt

(57) ABSTRACT

A method of constructing toy models based on an image of a subject present in a still or moving image, comprising: receiving said still or moving image; identifying said subject from the still or moving image; generating an instruction module and required building element list to construct a toy model of said subject; comparing the required building element list against an inventory of building elements held by a user; wherein if the inventory of building elements held by the user is insufficient to contain the required building element list, providing a list of missing building elements to the user; if the inventory of building elements held by the user is sufficient to contain the required building element list, producing the instruction module and the required
(Continued)

building element list to the registered user to create the model of the subject.

10 Claims, 4 Drawing Sheets

(51) Int. Cl.
*G06F 9/455* (2018.01)
*G06F 16/9035* (2019.01)
*G06Q 10/0875* (2023.01)

(58) Field of Classification Search
CPC ............ G06F 16/9035; G06Q 10/0875; G06Q 10/087; G06Q 30/06
See application file for complete search history.

(56) References Cited

U.S. PATENT DOCUMENTS

| | | | |
|---|---|---|---|
| 7,596,473 B2 | 9/2009 | Hansen et al. | |
| 8,374,829 B2 | 2/2013 | Jakobsen et al. | |
| 9,619,705 B1 | 4/2017 | Nordstrom | |
| 10,007,964 B1* | 6/2018 | Calhoon | G06T 3/40 |
| 2002/0106135 A1 | 8/2002 | Iwane | |
| 2004/0236539 A1 | 11/2004 | Clark et al. | |
| 2006/0136180 A1* | 6/2006 | Hansen | G06Q 50/04 |
| | | | 703/1 |
| 2008/0228450 A1* | 9/2008 | Jakobsen | G06T 19/20 |
| | | | 703/2 |
| 2010/0066531 A1* | 3/2010 | Karr | G06Q 10/00 |
| | | | 340/539.1 |
| 2014/0244018 A1* | 8/2014 | Bach | G06F 30/17 |
| | | | 700/103 |
| 2014/0244433 A1 | 8/2014 | Cruz | |
| 2014/0378022 A1 | 12/2014 | Muthyala et al. | |
| 2017/0097236 A1* | 4/2017 | Bender | G06Q 30/016 |
| 2017/0225073 A1* | 8/2017 | Laulund | A63F 13/40 |
| 2017/0304732 A1* | 10/2017 | Velic | G06V 20/66 |

OTHER PUBLICATIONS

Kozaki, Takuya, Hiroshi Tedenuma, and Takashi Maekawa. "Automatic generation of LEGO building instructions from multiple photographic images of real objects." Computer-aided design 70 (2016): 13-22. (Year: 2016).*
European Search Report and Opinion for Application No. 18790776.1 dated Sep. 14, 2021, 9 pages.
International Written Opinion for International Application No. PCT/AU2018/000061, mailed Aug. 30, 2018, 10 pages.
International Search Report for International Application No. PCT/AU2018/000061 mailed Aug. 30, 2018 (6 pages).
Australian Examination Report No. 1 for Application No. 2018259150 dated Apr. 17, 2023, 9 pages.
Australian Examination Report No. 2 for Application No. 2018259150 dated Mar. 12, 2024, 6 pages.
Kozaki et al., Automatic Generation of Lego Building Instructions from Multiple Photographic Images of Real Objects, Computer-Aided Design, vol. 70, (2016), pp. 13-22.

* cited by examiner

METHOD OF CONSTRUCTING TOY MODELS BASED ON AN IMAGE

CROSS-REFERENCE TO RELATED APPLICATIONS

This application is a national phase entry under 35 U.S.C. § 371 of International Patent Application PCT/PCT/AU2018/000061, filed Apr. 26, 2018, designating the United States of America and published as International Patent Publication WO 2018/195583 A1 on Nov. 1, 2018, which claims the benefit under Article 8 of the Patent Cooperation Treaty to Australian Patent Application Serial No. 2017901510, filed Apr. 26, 2017 and Australian Patent Application Serial No. 2018900678, filed Mar. 2, 2018.

TECHNICAL FIELD

The present disclosure relates generally to a system and method of sourcing, designing and assembling construction elements for the creation of construction models.

BACKGROUND

The ability to employ simple units to construct more complicated structures and elements has long been practiced by human kind as a means of entertainment and developing cognitive skills in the young. For infants and very young children, simple building blocks are provided to enable the child to develop their skills in stacking blocks and building simple constructions as part of their learning development. As a child grows, a variety of construction toy systems are available with multiple parts to further challenge the child in their abilities and to enhance their enjoyment. Overtime, the assembly of blocks to form shapes and models has become a common form of play and enjoyment for children and adults alike.

The most well-known construction toy sets commercially available are those sold under the brand name LEGO®. These toy sets generally comprise a variety of different types of interconnecting building elements having protrusions and corresponding cavities to enable interconnection between not only elements of the same type, but also elements of different types. Such a set of building elements enables substantially limitless possibilities of models that can be constructed and allows the ability to retain a constructed model for display purposes or to disassemble a constructed model and reuse the building elements.

Whilst it is possible to purchase the building elements of such sets separately or in bulk, most sets are generally sold in a packaged form suitable for creating a specific model, such as a car, spaceship, animal or building. When the building elements are purchased in such a predetermined set, the number of pieces provided in the set is generally sufficient to enable that specific model to be created, and there is generally an instruction manual provided with the set to assist the individual in making that model. The number of building elements and the complexity of the instructions provided is generally sufficient to cater for a variety of different age groups and assembly expertise.

As previously stated, some individuals, having constructed a model, may retain the model in its assembled form and never re-use the blocks. Other individuals, after assembling a model, may disassemble the model and reuse the pieces to make their own custom models as desired. In this regard, as an individual purchases more and more sets of building elements, their overall inventory of building elements also increases. They may then wish to seek to obtain instruction manuals for various other models and seek to build those models from their own inventory of building elements.

A problem with the existing distribution channel for such construction sets is to determine what other models can be made with the existing set of building elements, or inventory of elements, that has been collected by an individual. Whilst instruction manuals can be obtained for different models to be assembled, without purchasing the kit for that model, it is not clear whether an individual will have the correct building elements and in the correct number to complete the model. Further to this, for many, it is difficult to build a model without instructions. Thus, there is no facility to provide an individual to identify an object or item of interest and to obtain an instruction manual for assembling that item. Generally, LEGO® certified professionals are those that create models and the instructions to assemble models, which are reproduced for public use.

Thus, there is a need to provide a system and method that can turn every user into a LEGO® certified professional by enabling them to access this knowledge to not only generate instructions to create any model, but to also assess their inventory of building elements to determine whether an individual's inventory of building elements is sufficient to build that model.

The above references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present disclosure of which the identification of pertinent prior art proposals is but one part.

BRIEF SUMMARY

According to a first aspect, there is provided a method of maintaining an inventory of building elements for use in the construction of toy models comprising:

creating a user entry in a remotely accessible database to store a user's inventory of building elements;

receiving a list of model kits owned by the user and/or one or more photographs of assembled models and/or loose building elements in the user's possession;

identifying the building elements present in the list of model kits and/or the photograph of assembled models and/or loose building elements;

generating an inventory list of all identified building elements;

storing the inventory list in the user entry in the remotely accessible database; and updating the inventory list each time the user obtains a new model kit and/or new building elements.

The step of creating a user entry in a remotely accessible database may comprises registering the user with a host service managing the database to facilitate access to the user entry. The user may be registered by providing the user with a personal login and password to access the host service managing the database.

The step of receiving the list of model kits may comprise receiving a code or name identifying the model kit. The step of receiving the one or more photographs of assembled models and/or loose building elements may comprise uploading the one or more photographs to the host service. The step of generating the building elements present in the list of model kits may comprise accessing a historical database of model kits to identify the model kit that matches the received code or name and downloading the list of building elements present in the model kit.

The step of generating an inventory list of all identified building elements comprises applying a visual recognition program to the one or more received photographs of assembled models to identify a model kit used to build the assembled model and downloading the list of building elements present in the model kit. The step of generating an inventory list of all identified building elements comprises applying a visual recognition program to the one or more received photographs of loose building elements to identify each of the elements and to generate a list of building elements present in the one or more photographs.

The step of generating an inventory list of all identified building elements may comprise collating the list of building elements obtained from the one or more received photographs of loose building elements, the list of building elements present in each the model kit identified in the one or more received photographs of assembled models, and the list of building elements present in the list of model kits.

The step of updating the inventory list each time the user obtains a new model kit and/or new building elements may comprise identifying the new model kit and/or new building elements and generating a list of building elements present therein and adding the list of building elements to the inventory list stored in the remotely accessible database.

In accordance with another aspect, there is provided a method of constructing toy models based on an image of a subject present in a still or moving image, comprising:
    receiving the still or moving image;
    identifying the subject from the still or moving image;
    generating an instruction module and required building element list to construct a toy model of the subject;
    comparing the required building element list against an inventory of building elements held by a user; wherein
    if the inventory of building elements held by the user is insufficient to contain the required building element list, providing a list of missing building elements to the user;
    if the inventory of building elements held by the user is sufficient to contain the required building element list, producing the instruction module and the required building element list to the registered user to create the model of the subject.

The step of receiving the still or moving image may comprise the user downloading an electronic file containing the still or moving image to a remote host service.

The step of identifying the subject from the still or moving image may comprise applying image recognition analysis to the still or moving image to identify the subject present therein. The step of identifying the subject from the still or moving image may further comprise conducting an on-line search of images on the internet to identify the subject present therein. The step of identifying the subject from the still or moving image may comprise a further step of confirming the identity of the subject with the user.

The step of identifying the subject from the still or moving image may further comprise a step of searching a database of existing model subjects to identify a list of existing sets of instruction modules and required building elements for the same or similar subject for selection by the user. Upon selection of an existing set of instruction modules and required building elements by the user, the selected set of instruction modules and required building elements may be compared against an inventory of building elements held by the user to determine if the user's inventory of building elements is sufficient to build the model of the subject. If the user's inventory of building elements is sufficient the selected set of instruction modules and required building elements may be produced to the user to create the model of the subject.

The step of generating an instruction module and required building element list to construct a toy model of the subject may comprise analyzing the shape of the subject to determine the number of building elements required to make the basic predefined shape based on prior data generated through the generation of historical instruction modules and required building element lists for such shapes.

The step of comparing the required building element list against an inventory of building elements held by a user may comprise comparing the required building element list against a stored inventory of building elements separately maintained for the user. The stored inventory of building elements may be obtained by the method of any one of claims 1-9.

According to yet another aspect, the present disclosure provides a method of generating an individual LEGO avatar for a user, comprising:
    prompting the user to take a photograph of their image via the user's electronic device;
    receiving the photograph of the user at a remote host service;
    analyzing features of the user present in the photograph;
    generating an electronic avatar version of the user in a LEGO format;
    uploading the electronic avatar version of the user to the user's electronic device for use.

BRIEF DESCRIPTION OF THE DRAWINGS

The present disclosure may be better understood from the following non-limiting description of preferred embodiments, in which.

DETAILED DESCRIPTION

Preferred features of the present disclosure will now be described with particular reference to the accompanying drawings. However, it is to be understood that the features illustrated in and described with reference to the drawings are not to be construed as limiting on the scope of the present disclosure.

The system and method of the present disclosure will be described below in relation to its application for use in a network application. It will be appreciated by those skilled in the art that the present disclosure could be used across any variety of networks and still maintain the spirit of the present disclosure.

Figure 1:
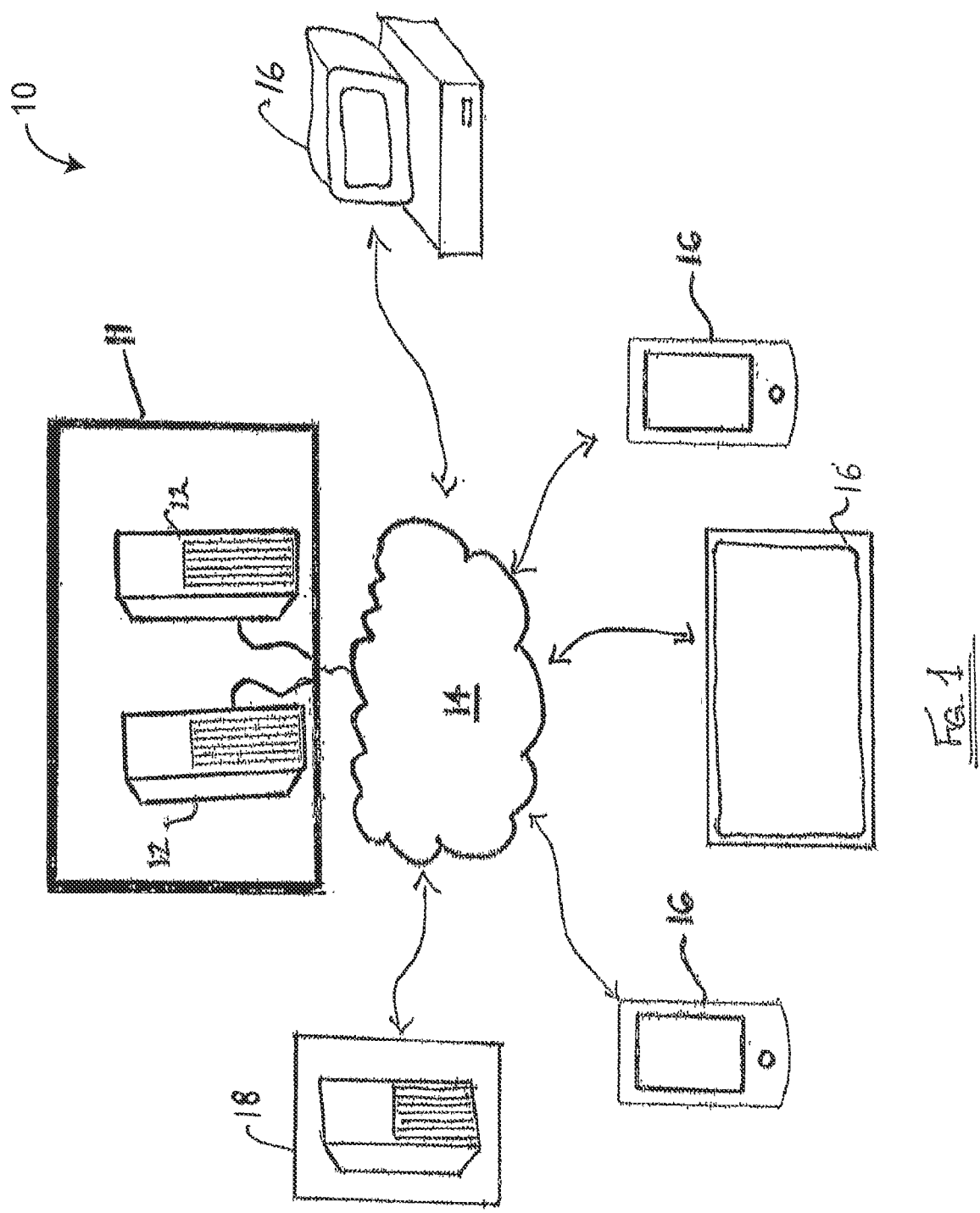
FIG. 1 is a simplified view of a masterbuilder system in accordance with the present disclosure.

Referring to FIG. 1, an embodiment of a system 10 in accordance with the present disclosure is depicted. The system 10 will be referred to as a masterbuilder system.

The system 10 generally includes a network 14 that facilitates communication between a host service 11 and one or more remote users 16.

The host service 11 is depicted as comprising one or more host servers 12 that communicate with the network 14 via wired or wireless communication, as will be appreciated by those skilled in the art. The one or more host servers 12 are configured to provide an interface to enable users to register with the system and to access the system to generate model instructions and to share information with other registered users. The host servers 12 are able to house multiple databases necessary for the operation of the methods and systems of the present disclosure and for the storage of information collected for each individual remote user 16. The servers 12 may comprise any of a number of servers known to those skilled in the art and are intended to be operably connected to the network 14 so as to operably link to the plurality of remote users 16 by way of a personal electronic computing device. The servers 12 typically include a central processing unit or CPU that includes one or more microprocessors and memory operably connected to the CPU. The memory can include any combination of random access memory (RAM), a storage medium such as a magnetic hard disk drive(s), solid state hard drive(s) and the like.

In a preferred embodiment, the distributed computing network 14 is the internet or a dedicated mobile or cellular network in combination with the internet, such as a GSM, CDMA or WCDMA network. Other types of networks such as an intranet, an extranet, a virtual private network (VPN) and non-TCP/IP based networks are also envisaged, as well as Wi-Fi and BLUETOOTH® networks.

The remote users 16 may access the network 14 and the host service 11 by way of an electronic computing device, such as a personal computer, laptop, tablet, smart phone or similar device. Each remote user's device is configured with a dedicated software application to assist the user in accessing the host service 11 to register and utilize the services offered by the host service over the network 14. In an alternative embodiment, the computing device may be configured such that it is able to communicate with the host service 11 via a web browser thereby obviating the need to download dedicated software for this purpose.

The memory of the servers 12 may be used for storing an operating system, databases, software applications and the like for execution on the CPU. As will be discussed in more detail below, in a preferred embodiment the database stores data relating to each registered user of the system 10, as well as information relating to historical requests and instructions for models generated by the user and created by the host service.

The host service 11 is also configured to communicate with third party systems 18 for processing data and accessing separately controlled information, or information that is stored by the third party and made available to the host service 11 by way of a license or other similar arrangement. This communication is achieved across the network 14 in a conventional manner as previously described. Third party systems 18 may include commercial manufacturers and suppliers of construction toy sets, such as LEGO System A/S, who can supply information regarding the type and configuration of construction pieces available as well as a history of catalogues and listings of existing instruction manuals and model types that have been created by LEGO System A/S. Such information can be accessed by the host service 11 for determining the type and number of parts required to construct a user initiated model, as well as information to assist in generating instruction manuals for user initiated models. The host service 11 may also be able to communicate with data processing mediums to facilitate the processing of data generated by the host service 11 upon request by a user. Such mediums may include supercomputers such as IBMs Watson that combines artificial intelligence (AI) and analytical software for optimizing performance as a question answering machine.

As discussed above, each user 16 is connected to the network 14 by way of their computing device. Such an arrangement enables communication with the host service, as well as between other users 16, who are registered with the host service 11. Each user 16, may be appropriately configured to remotely access a portal provided by the host service 11 such that user's computing device does not require any dedicated software to access the system but can merely access the system via the host service 11 homepage over the network.

Irrespective of the manner in which each user 16 accesses the system of the present disclosure, in order for each user 16 to access the service hosted by the host service 11, each player is required to initially register with the host service 11.

In this regard, each user 16, via their computing device, accesses the host service 11 by way of a guest user interface. The guest user interface provides a simple means for the host service 11 to obtain the relevant details from the user, such as name, address, contact details, and any other details considered relevant to establish the identity of the new user. The new user will be required to establish a user id and password for future access with the host service 11 and the registration details of the user will be recorded in a user profile database stored in the servers 12 of the host service 11.

Each time the user returns to the host service 11 and enters their user id and password, they will be linked to their user profile stored in the host server's user profile database.

Figure 2:
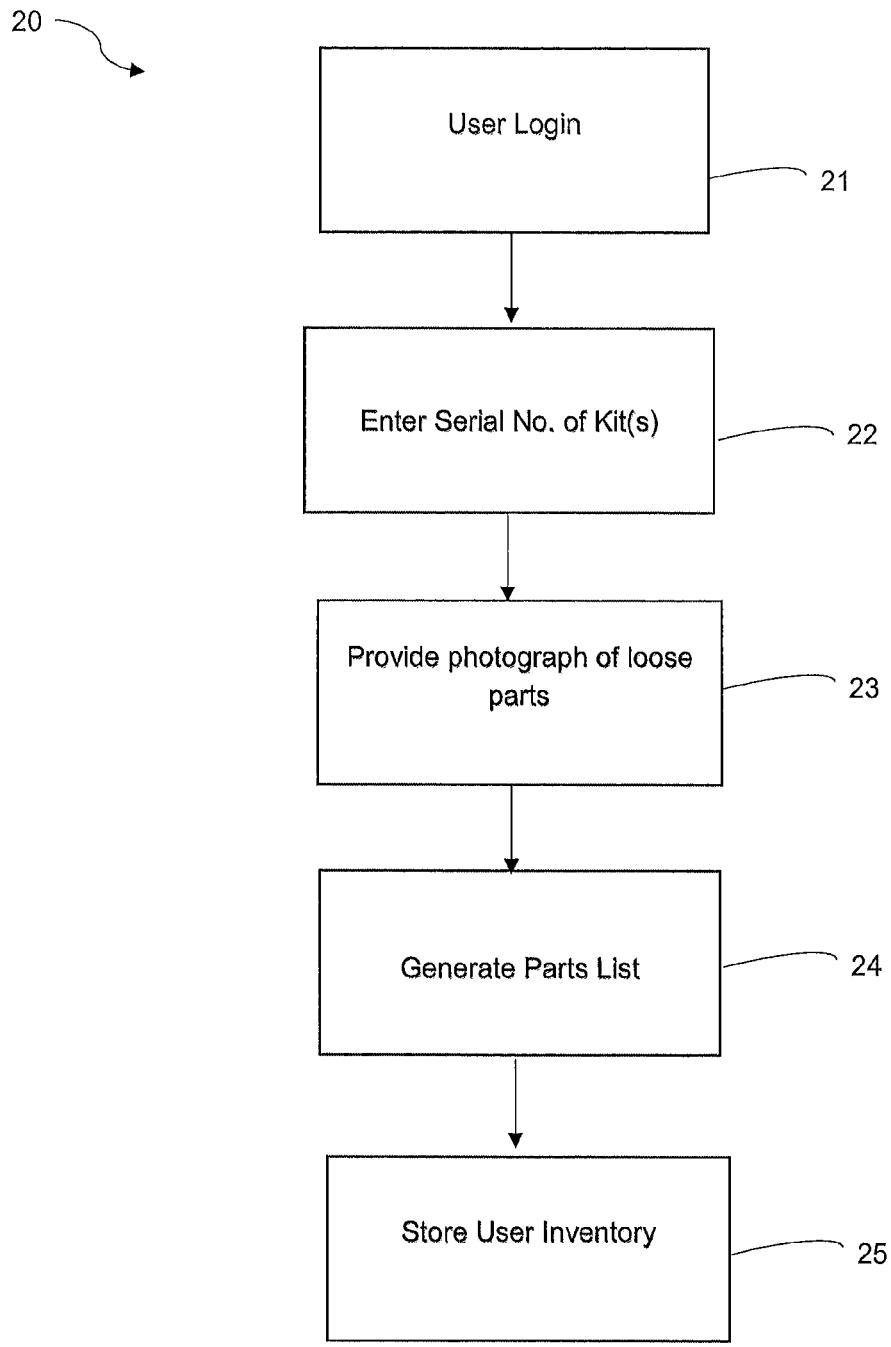
FIG. 2 is a flow diagram depicting the steps of registering a user with the masterbuilder system of FIG. 1.

As part of the registration process, each user may initially employ the services of the host service 11 to create an inventory of the individual construction pieces the user possesses. This can be achieved in accordance with the method 20 shown in FIG. 2.

In step 21, the user logs into the host service 11 by way of their personal electronic device via the network 14. The user will enter their personal log-in details, such as a unique user name and password and they will be presented with a home screen where they can create/update their inventory list. If the user has not generated an inventory list previously they can create such an inventory list or if the user has created an inventory list previously, they can update their inventory list with new pieces. By selecting an appropriate icon, the user will then be presented with the first option depicted as step 22.

In step 22, the user is asked to enter any serial numbers of kits that they have previously purchased and which they retain all the elements from. Each kit has a predetermined serial number, which identifies the number of parts provided in that kit, which can be readily accessed from the third party system 18, or via the information stored in the servers of the host service 11. The host service will then record the number and type of building elements present in that kit and update the user's inventory list, accordingly.

In step 23, the user is asked to provide a photograph of any loose parts that they may have, which are not associated with any specific kit. Such loose parts are to be arranged in a predetermined orientation, such as face up, preferably against a plain colored background. A photograph is then taken of the loose parts and uploaded to the host service 11 for action. Similarly, if the user has fully assembled models and does not wish to dismantle the models and is not aware of the serial number of that model, they can simply take a photograph of the assembled model, which will be uploaded to the host service for assessment. Whilst reference is made to a photograph, it will be appreciated that any image of the parts ad or assembled model will suffice for this purpose, including a video or moving image.

In step 24, the host service 11 generates a list of all elements held by the user. This involves collating the specific kits by their serial numbers and generating an inventory of all elements. For photographs, the host service employs visual recognition software to identify individual building elements and adds these elements to the user's inventory list. This will typically involve the visual recognition software analyzing the dimensions of each of the elements and comparing the analyzed dimensions against pre-stored dimensions of all existing elements. The software may also analyses the various features of the elements, such as the number of connector projections and shape of the element to further aid in identifying the element. For assembled models, the host service 11 employs visual recognition software to identify the model kit and determine the serial number of that model kit, from which a listing of individual parts are obtained and added to the user's inventory list. Upon this assessment, a current inventory list is created for that user and stored against that user's profile in step 25.

It will be appreciated that each time a user purchases a new model kit, they can simply access the host service 11 and enter the serial number of that kit against their inventory list such that those elements will be added to update their inventory list. Alternatively, this may be done automatically by the user scanning the serial number or similar identifier of the kit with their smart phone or similar device, at which stage the details will be forwarded to the host server and the user profile will be updated to record the addition of elements to the inventory list. As part of this service, the host service 11 will be able to supply or direct the user to electronic instruction modules for each of the kits in their possession in the event that the original instruction models for that kit have been lost or misplaced. The host service 11 is also able to make suggestions of other models that could be made by the user, based on the user's inventory of elements, and provide or direct the user to instruction modules for these suggested models.

It will be appreciated that by offering such a service to maintain and update an inventory listing of the various building elements in the possession of the user, the user is able to maximize usage of their elements and continue to build and design models long after the original model has been constructed. The service also enables the user the ability to analyses their inventory of elements to identify elements that they may require more of, for future purchase.

Figure 3:
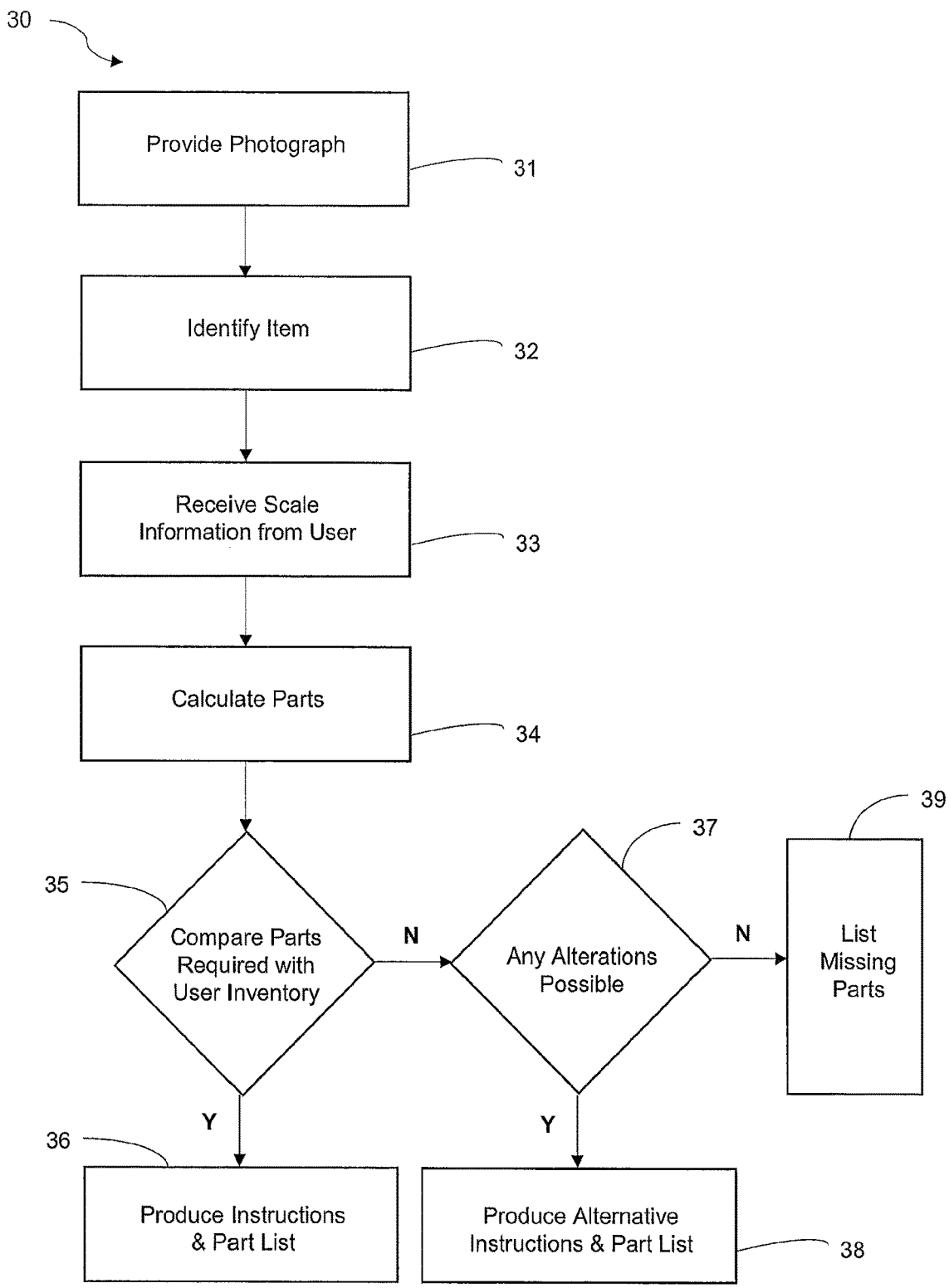
FIG. 3 is a flow diagram depicting the steps of generating a plan and part list for creating a model requested by a user of the masterbuilder system.

The system of the present disclosure can also be employed to enable users the ability to personalize the models they would like to construct, this can be done in accordance with the method 30 as shown in relation to FIG. 3.

In step 31, the user is able to access the host service 11, to submit a model to the host service for construction. In this regard, the user is able to submit a photograph of an item they are interested in building, which may be something that they see in real life, or a movie or the like. This could include a sports car parked in a street or the family car or boat. By way of an example for describing the present process, the user has taken a photograph of the Olympic rings and has submitted this to the host service via the software application provided on their smart phone or similar device. It will be appreciated that the image could be a still image, such as a photograph, or a moving image, such as a video of the item to be reproduced.

In step 32, the host service 11 identifies the item by way of image recognition software and confirms this with the user via the software interface. The image recognition software may be maintained by the host service or by a third party and may include artificial intelligence to aid in identifying the object from the provided image. In this step, the host service 11 may also display a list of known instruction modules for making the same or similar identified object and the user may select an existing instruction module from the list or may continue to generate a new model design.

In step 33, the host service can recommend a size scale for building the model based on the user's inventory of building elements, and the user is able to override this recommendation by conveying to the host server the scale that they would like to make the model.

In step 34, the host server 11 is able to calculate the number of building elements (blocks) required to make the model to the scale confirmed by the user. This is generally done by the host server breaking the model into a number of basic predefined shapes and determining the number of building elements required to make the basic predefined shape based on prior data generated through the catalogue of historical models. This number can then be scaled up depending upon the scale requested by the user. For the example of the Olympic rings, the software will determine that the image comprises five circles and will determine the number of building elements required to make a basic circle shape and then compensate for the interlocking nature of the rings and the scale of the rings that is requested by the user to calculate the final number and list of building elements.

Upon determining this calculation in step 34, in step 35 the host server 11 then compares the number and type of building elements that have been calculated to be required against the number and type of building elements held by the user in their inventory stored against their profile. If the user's inventory of building elements is sufficient to cover the building elements required to make the model, the host service will supply an instruction module as well as a building element list to the user for construction in step 36.

If, in step 35 the number of building elements in the user's inventory is determined to be insufficient to build the model, the host server 11 then looks to see if they can make alterations to the determined model to use other building elements owned by the user for those missing building elements determined in step 37. If this is possible, an alternative instruction module and building elements list is provided to the user in step 38 for the user to create the model. If this is not possible, a list of missing building elements for the user to acquire to make the model is provided in step 39.

The user is then able to act as required to gather the required building elements or construct the model in accordance with the instruction module as generated.

Figure 4:
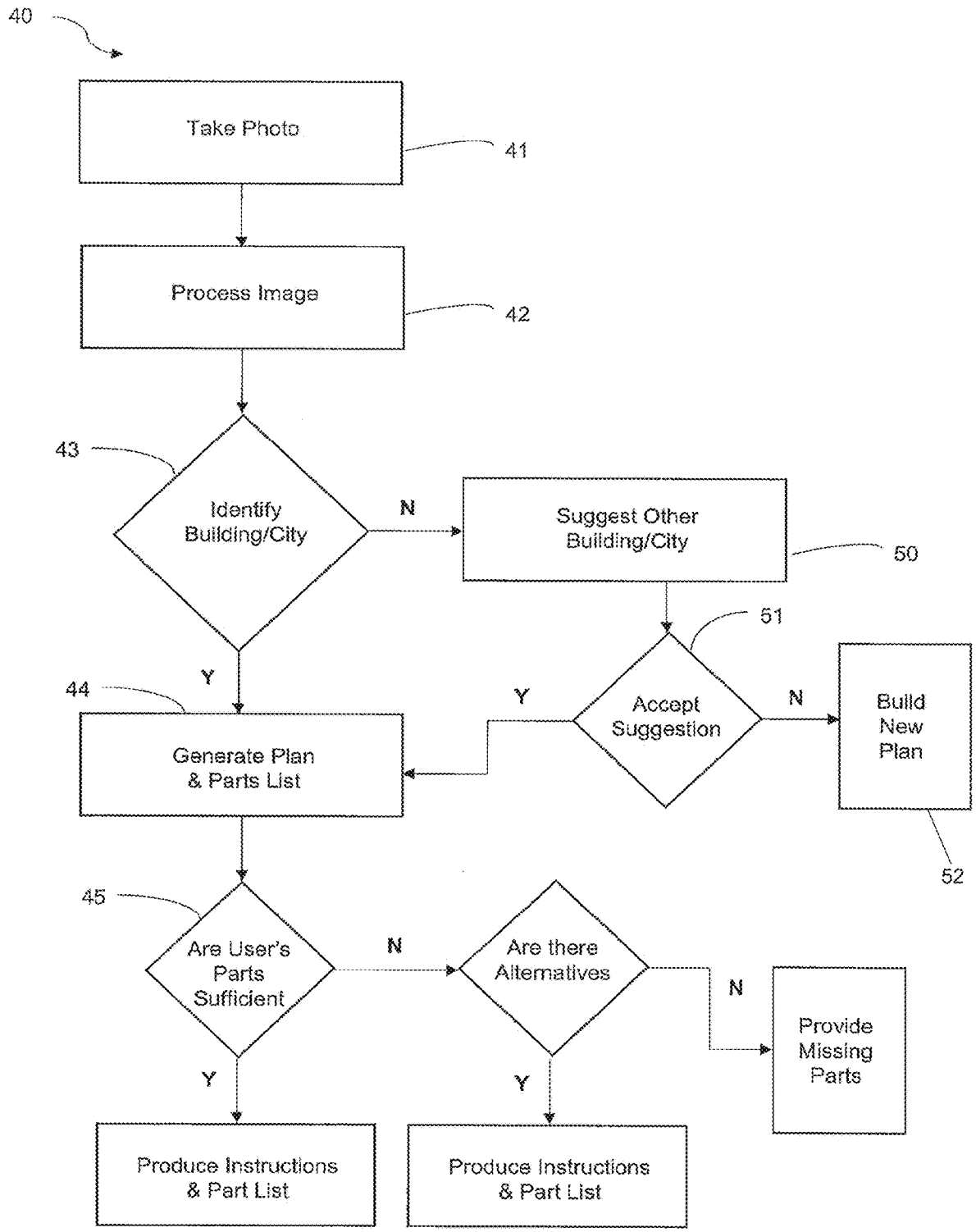
FIG. 4 is an alternative flow diagram depicting the steps of generating a plan and part list for creating a model requested by a user of the masterbuilder system

For more complex models, such as Building facades or streetscapes, a method 40 as depicted in FIG. 4 is be provided.

In step 41, the user takes a photograph or video of a building or streetscape via a camera on their smart phone or similar device. This is then submitted to the host service 11 for analysis in step 42. The host service 11 may process the image and apply image recognition processes as well as any GPS information that may be supplied with the photograph by the user to identify the Building/City of step 43. Alternatively the host service 11 may employ third party software, such as artificial intelligence software, to identify the model present in the image.

If no building or city is able to be identified by the host service 11 in step 43, the host service 11 may suggest alternative building/cityscape to the user in step 50. These suggested alternatives may be based on a search of the historical model database to identify similar models that have previously been designed. If the user accepts this suggestion in step 51, the host service will then generate an instruction module and a building element list for this alternative model in step 44. If, in step 51, the user does not accept this suggestion the host server may request further images, such as photographs and/or information in step 52 to identify the item to be modelled so as to generate an instruction module and building element list.

After the host service has generated the instruction module and building element list in step 44, the host service then compares the building element list against the building element inventory for the user in step 45. The host server will seek alternatives if the user's building element inventory is insufficient to cover the building elements required, as is previously described in relation to FIG. 3.

In an alternative embodiment of the present disclosure, the system and method of the present disclosure can be used to generate an avatar or character based on the individual user's image in LEGO block form. This can be achieved through the user 16 accessing the host service 11 by way of the software application in their personal computing device.

From the user interface of the user's personal computing device, the user will be able to align their own head and/or body and take a photograph of their head and/or body. The host service 11 is then able to apply visual recognition software to the photograph to recognize individual characteristics or distinctive features of the user's face/head/body, such as hair color, hair style, eye color, eye shape etc. This may be achieved through the host service applying any number of known application programming interfaces that employ facial recognition and feature capture, and could utilize IBMs Watson supercomputer that combines artificial intelligence (AI) and analytical software for obtaining such information.

Upon obtaining such visual characteristics, the host service 11 is then able to convert these features into a head avatar of the user as well as an instruction module and building elements listing for creating the user's body if required. The user is then able to use the avatar in an animated form to express emotions and send messages across messaging mediums and other social media mediums to function as an EMOJI to convey emotions and other messages to provide a personalized on-line experience.

This aspect of the present disclosure can be further extended such that the user can take a full body photograph and have the host service 11 generate building elements list and instruction module to replicate the user's body shape and size, thus turning the user into a constructable minifigure. The host service can then generate instructions for the user to create their own minifigure for play and display purposes. Thus the user can have an electronic block version of themselves as well as a physical block version made from building elements.

It will be appreciated that the system of the present disclosure provides a simple and effective means for accessing, generating and analyzing construction plans for a creating a variety of models from building elements. Such a system and method utilizes existing knowledge and experience obtained by creating model instructions over time and provides access to this knowledge for generating instructions to construct any model based on a user's desires and requirements.

The system and method is also capable of analyzing and tracking the user's building elements inventory to provide a range of model options capable of being built with the building elements in the user's possession as well as a wide variety of instruction manuals for this purpose.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the present disclosure described herein without departing from the spirit and scope of the present disclosure.

The invention claimed is:

1. A method of generating instructions for creating a toy model of a subject present in a digital image, the method comprising:
   receiving the digital image of the subject in a computer system, the computer system comprising a microprocessor and a non-transitory computer-readable storage medium storing instructions thereon that, when executed by the microprocessor, cause the computer system to:
   generate a digital model that mimics an appearance of the subject using the digital image;
   receive a size scale of the toy model;
      generate a list comprising a calculated number of toy building elements required to construct the toy model of the subject based on the digital model of the subject and the received size scale of the toy model;
      generate instructions for building the toy model of the subject using the list of toy building elements required to create the toy model of the subject;
      compare the list of toy building elements required to build the toy model of the subject with an inventory list of toy building elements possessed by a user;
      determine that the toy building elements represented in the inventory list are insufficient to construct the toy model of the subject based on the comparison of the list of toy building elements required to build the toy model and the inventory list of toy building elements possessed by the user;
      determine an alternate digital model that mimics the appearance of the subject, wherein the alternate digital model would allow the toy model to be constructed based on the inventory list of toy building elements possessed by the user and the received size scale of the toy model;
      generate alternate instructions for building the toy model and an alternate list of toy building elements required to construct the toy model based on the alternate digital model; and
      output the alternate instructions for building the toy model of the subject and the alternate list of required toy building elements required to construct the toy model of the subject to the user.

2. The method of claim 1, wherein receiving the digital image of the subject comprises downloading an electronic file containing the digital image of the subject to a remote host service.

3. The method of claim 1, wherein generating the digital model of the subject comprises applying image recognition analysis to the digital image to identify the subject present therein.

4. The method of claim 3, wherein applying image recognition analysis to the digital image to identify the subject present therein further comprises conducting an on line search of images on the internet.

5. The method of claim 3, wherein applying image recognition analysis to the digital image to identify the subject present therein further comprises confirming the identity of the subject with the user.

6. The method of claim 5, further comprising searching a database of one or more other model subjects and identifying a list of existing instructions for constructing the one or more other model subjects, wherein the one or more other model subjects are the same as the subject from the digital image or are identified as alternate models within a model database based, at least, on the subject from the digital image.

7. The method of claim 6, further comprising selecting instructions for constructing the other model subjects from the list of existing instructions for constructing the other model subjects, the selected instructions are further compared against the inventory list of building elements held by the user to determine if the inventory list of building elements held by the user includes all elements required to build the one or more other model subjects.

8. The method of claim 1, further comprising analyzing one or more shapes of the subject to determine the number of building elements required to make a basic predefined shape of the one or more shapes of the subject based on prior data generated through accessing a historical database of instruction lists comprising required building element lists for the one or more shapes.

9. The method of claim 1, wherein the inventory of building elements possessed by the user is stored and maintained in a remotely accessible database.

10. The method of claim 9, wherein the inventory of building elements possessed by the user is stored and maintained in the remotely accessible database through a method comprising:
creating a user entry in the remotely accessible database;
receiving the inventory list of building elements possessed by the user;
receiving a digital image of a built toy model;
identifying a list of building elements from the digital image of the built toy model;
generating a combined inventory list comprising the list of building elements from the digital image of the built toy model and the inventory of building elements possessed by the user;
storing the combined inventory list in the remotely accessible database; and
updating the combined inventory list each time a digital image of a new built toy model is received.

* * * * *